UNITED STATES PATENT OFFICE.

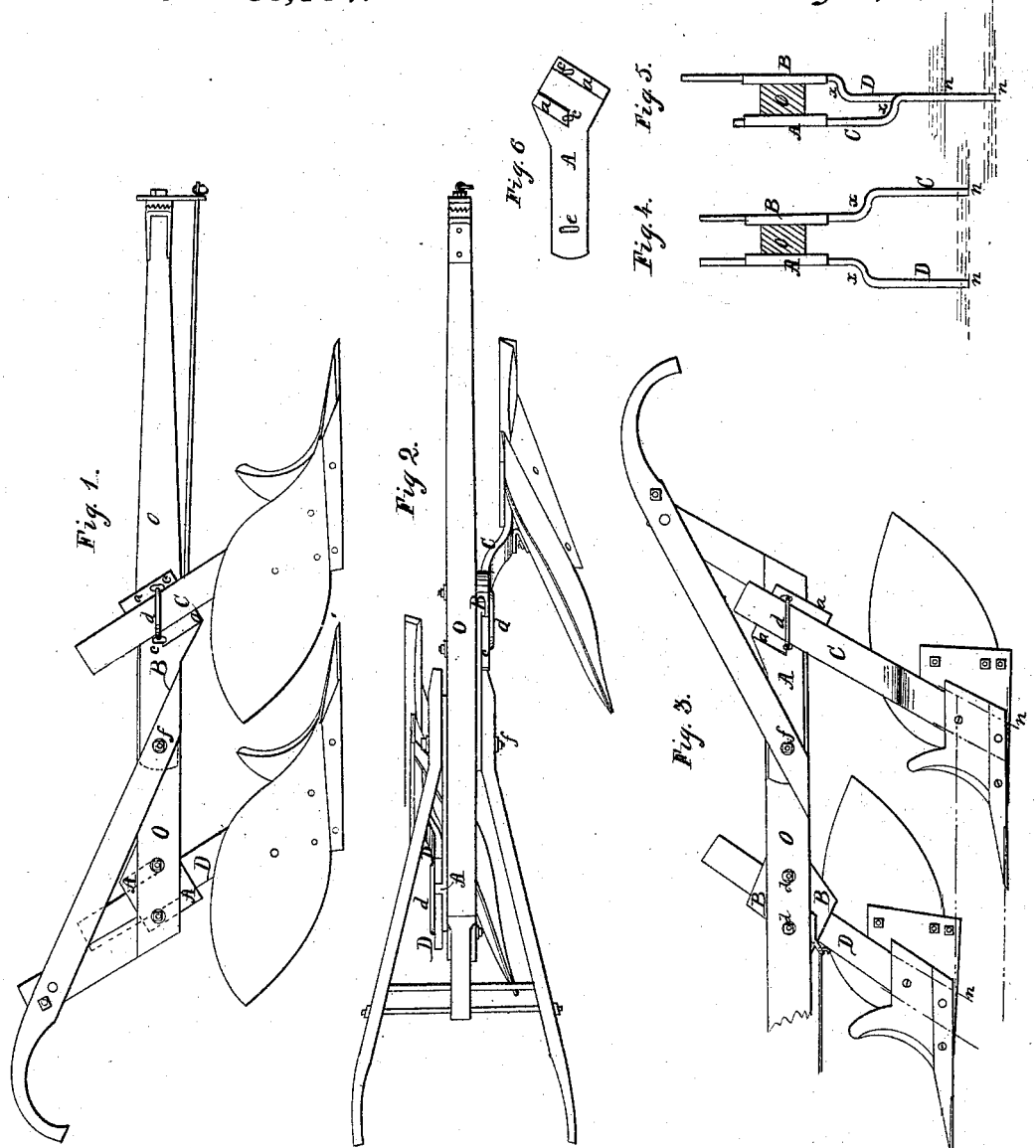

G. W. N. YOST, OF NASHVILLE, TENNESSEE, ASSIGNOR TO HIMSELF AND WILLIAM DILWORTH, JR.

IMPROVEMENT IN DOUBLE PLOWS.

Specification forming part of Letters Patent No. 39,537, dated August 11, 1863.

*To all whom it may concern:*

Be it known that I, GEORGE W. N. YOST, of Nashville, Tennessee, have invented certain new and useful Improvements in Double-Furrow Plows; and I do hereby declare that the following is a full and exact description thereof, reference being had to the accompanying drawings, and to the letters of reference marked thereon.

In the drawings, Figure 1 is a side elevation, showing the plow when cutting two furrows wide. Fig. 2 is a plan view of the same. Fig. 3 is a side elevation, showing the plow when cutting two furrows deep. Fig. 4 is a section of the beam, showing the position of the standards C and D for plowing two furrows wide. Fig. 5 is a view of the same when plowing two furrows deep. Fig. 6 shows one of the wrought-iron standard-holders.

To enable others to make and use my invention, I will describe its construction and operation.

O indicates the beam of the plow; A and B, the wrought-iron standard-holders, which are made of plates provided with lugs *a a*, so attached as to form a square groove for the reception of the standards. They are also provided with slots *c c* for the staple *d* to pass through, and slot *e* for bolt *f*. The object of these slots is to permit the adjustment of the standard-holders, so that the standards may be given different inclinations with relation to the beam. When the standard-holders have the desired position their bolts and staples are drawn tight, thus securing them.

C and D indicate the plow-standards, which are made of wrought-iron bars of a size and shape to fit and slide in the grooves of the standard-holders A B. They are bent as shown at *x*, Figs. 4 and 5. The plows of the desired form are properly secured to the standards C and D.

When it is wished to use the implement for plowing two furrows wide I place the standard C in the groove of the standard-holder B and the standard D in the groove of the standard-holder A. The standards then being arranged as desired, (see Figs. 1, 2, and 4,) the staples *d* and bolt *f* are tightened by their respective nuts, thus securing the standards in their standard-holders and the standard-holders to the beam at the desired inclination. In this case the bend of the standards is outward, so that their lower ends, *n*, to which the plows are affixed, shall be apart from each other a distance equal to the width of the furrow, (see Figs. 2 and 4,) but having the ends of both standards on the same level.

When it is wished to change the plow and cut two furrows deep I remove the standards from their standard-holders and place standard C in standard-holder A instead of in holder B, and standard D in holder B instead of in holder A. The rear standard, C, is then arranged so that its lower end, *n*, shall be as much lower than the end of the front standard, D, as shall equal the depth of the second furrow. In this case the lower ends of the standards will be in the same vertical line with each other and in line with the center of draft, as is clearly shown in Fig. 5.

By my above-described invention I can readily change my plow so as to cut either two furrows wide or two furrows deep, and can regulate the depth of cut as may be desired, and at the same time produce a cheap, strong, and desirable implement.

I do not confine myself to the use of any particular kind of plow, but may attach any suitable kind to the standards.

Having thus fully described my invention, what I claim as new, and desire to secure by Letters Patent, is—

1. The construction and arrangement of the wrought-iron standard-holders A B, in combination with the beam O of the plow, substantially as herein set forth and described.

2. The combination and arrangement of the plow-standards C D with the beam of the plow, operating so as to turn two furrows wide or two furrows deep, substantially as herein set forth.

G. W. N. YOST.

Witnesses:
D. B. TAYLOR,
H. F. HATCH.